United States Patent [19]

Wendt et al.

[11] Patent Number: 5,277,126
[45] Date of Patent: Jan. 11, 1994

[54] TROLLEY ROLLER ASSEMBLY

[75] Inventors: Bernard J. Wendt, Davisburg; Thomas L. Beno, Farmington Hills, both of Mich.

[73] Assignee: Allor Manufacturing, Inc., Novi, Mich.

[21] Appl. No.: 34,479

[22] Filed: Mar. 19, 1993

[51] Int. Cl.$^5$ ............................................. F16C 33/00
[52] U.S. Cl. ........................................ 105/155; 105/148; 384/486; 277/53
[58] Field of Search .................... 104/89, 95; 105/155, 105/148, 154; 16/45, 107, 97, 46, 47, 48, 98, 102, 106; 301/5.3, 5.7, 122; 277/53, 55; 384/480, 477, 481, 482, 484, 486

[56] References Cited

U.S. PATENT DOCUMENTS

| | | | |
|---|---|---|---|
| 1,600,878 | 9/1926 | Hegarty . | |
| 2,250,167 | 7/1941 | Niles et al. | 105/154 |
| 2,517,652 | 8/1950 | Gaboury | 198/177 |
| 2,584,610 | 2/1952 | Pearson | 105/154 |
| 2,611,326 | 9/1952 | Smallpeice | 105/154 |
| 2,655,392 | 10/1953 | Lighthall | 286/5 |
| 2,861,850 | 11/1958 | Nyblom | 308/236 |
| 2,985,113 | 5/1961 | Cotesworth | 105/114 |
| 3,010,771 | 11/1961 | Cogger | 308/187.2 |
| 3,071,385 | 1/1963 | Greiner | 277/94 |
| 3,090,628 | 5/1963 | Giulietti | 277/94 |
| 3,588,206 | 6/1971 | Frost | 308/187.1 |
| 3,602,150 | 8/1971 | Frost | 104/172.5 |
| 3,739,424 | 6/1973 | Gonsalves et al. | 16/98 |
| 3,792,912 | 2/1974 | Howe et al. | 308/187.2 |
| 4,384,387 | 5/1983 | Pachuta | 16/107 |
| 4,464,997 | 8/1984 | Dehne | 104/172.5 |
| 4,993,328 | 2/1991 | Wendt | 105/150 |

FOREIGN PATENT DOCUMENTS

| | | | |
|---|---|---|---|
| 2643956 | 9/1990 | France | 105/155 |
| 640392 | 7/1950 | United Kingdom . | |
| 1082612 | 9/1967 | United Kingdom . | |

*Primary Examiner*—Mark T. Le
*Attorney, Agent, or Firm*—Krass & Young

[57] ABSTRACT

A trolley roller assembly for use with a conveyor system and including a roller for rolling engagement with a track of the conveyor system and having a central bore, a trolley hanger, a pin member having a shaft portion passing through an aperture in the hanger and positioned in the roller bore, and a bearing interposed between the pin shaft portion and the roller. The pin member further includes an enlarged head portion positioned in the roller bore and forming an annular shoulder with the pin member shaft portion and the bearing comprises an outer race, a plurality of balls relatively mounted in the outer race, and an inner race formed in part by the pin member head portion and in part by a collar surrounding the pin member shaft portion and positioned against the annular shoulder of the pin member. The inner race is formed in part by an arcuate annular groove in the pin member head portion and in part by a complementary annular arcuate groove in the collar. Each arcuate groove defines approximately one half of the inner race and the annular arcuate grooves in the head portion and in the collar coact to define an included angle of at least 100°.

4 Claims, 3 Drawing Sheets

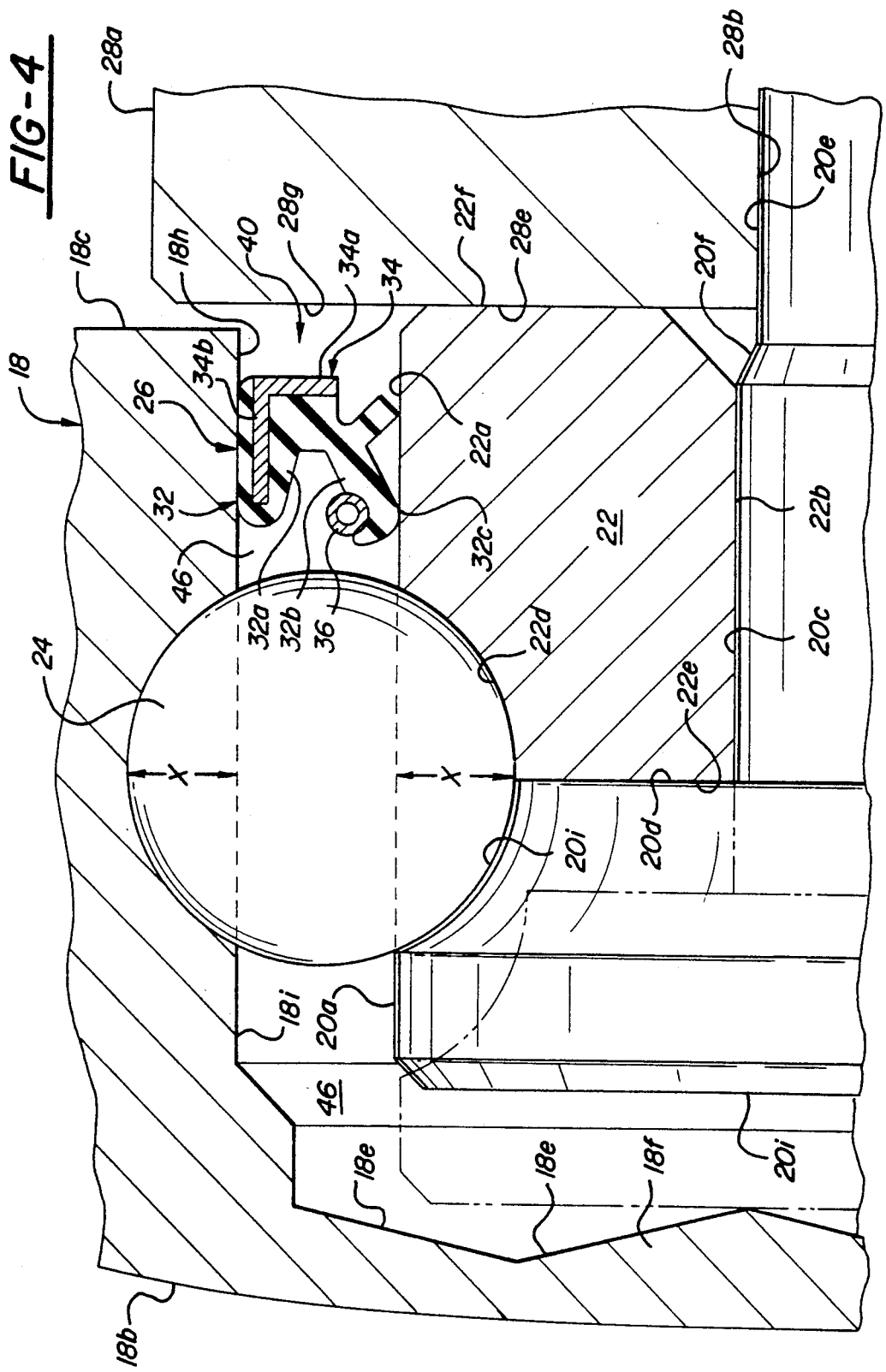

TROLLEY ROLLER ASSEMBLY

BACKGROUND OF THE INVENTION

This invention relates to trolley assemblies.

In various manufacturing and warehouse facilities is common practice to use overhead tracks for moving suspended loads between spaced points within the facility. The loads are typically carried by trolley assemblies which include rollers at their upper ends rollably guiding on the track and further include hangers carried by the rollers and depending downwardly from the rollers to provide a carrier for the suspending loads. Whereas trolley assemblies of this general type provide an effective means of moving loads from point to point within warehousing or manufacturing facilities, the trolley assemblies tend to be rather high maintenance items and tend to have a relatively short product life. Specifically, when subjected to heavy twisting forces generated by heavy loads being carried by the hangers, the trolley bearing elements and the raceways receiving the bearing elements may suffer both outer diameter and inner diameter corner damage which requires immediate repair of replacement.

SUMMARY OF THE INVENTION

This invention is directed to the provision of an improved trolley roller assembly.

More specifically this invention is directed to the provision of an improved trolley roller assembly that is extremely resistant to bearing damage even when subjected to heavy twisting loading.

The invention trolley roller assembly is intended for use with a conveyor system and includes a roller for rolling engagement with the track of a conveyor system and having a central bore, a trolley hanger, a pin member having a shaft portion passing through an aperture in the hanger and positioned in the trolley bore, and bearing means interposed between the pin shaft portion and the roller.

According to the invention, the pin member further includes an enlarged head portion positioned in the roller bore and forming an annular shoulder with the pin shaft portion and the bearing means comprises an outer race, a plurality of balls rollably mounted in the outer race, and an inner race formed in part by the pin head portion and in part by a collar surrounding the pin shaft portion and positioned against the annular shoulder of the pin member. This specific arrangement for defining the inner race allows the race to have a depth that represents a substantial portion of the ball diameter so as to provide extreme resistance to overturning moment loads in the bearing and thereby preclude ball bearing element and raceway corner damage.

According to a further feature of the invention, the inner race is formed as an annular groove in the roller opening in the roller bore. This arrangement simplifies the assembly construction and allows the outer race to have a depth representing a substantial portion of the ball diameter so as to further resist overturning moment loads in the bearing and further preclude ball bearing element and raceway damage.

According to a further feature of the invention, the roller bore is a blind bore having a blind end formed by the roller and at an open end, and the pin shaft portion enters the bore through the open end of the bore. This arrangement provides a positive and absolute seal of the bore at the blind end of the bore thereby simplifying and improving lubricant sealing of the assembly.

According to a further feature of the invention, the collar defines an annular opening with the roller bore, a seal is positioned in the annular opening, and the hanger includes a head portion defining the aperture in the hanger passing the shaft portion of the pin member, positioned against the outboard face of the collar, and having a diameter exceeding the diameter of the collar. This arrangement allows the head portion of the hanger to at least partially cover the outboard end of the annular opening so as to protect the seal from direct contaminant access.

BRIEF DESCRIPTION OF THE DRAWINGS

FIG. 4 is an enlarged view taken within the circle 4 of FIG. 3;

DETAILED DESCRIPTION OF THE PREFERRED EMBODIMENT

Figure 2:
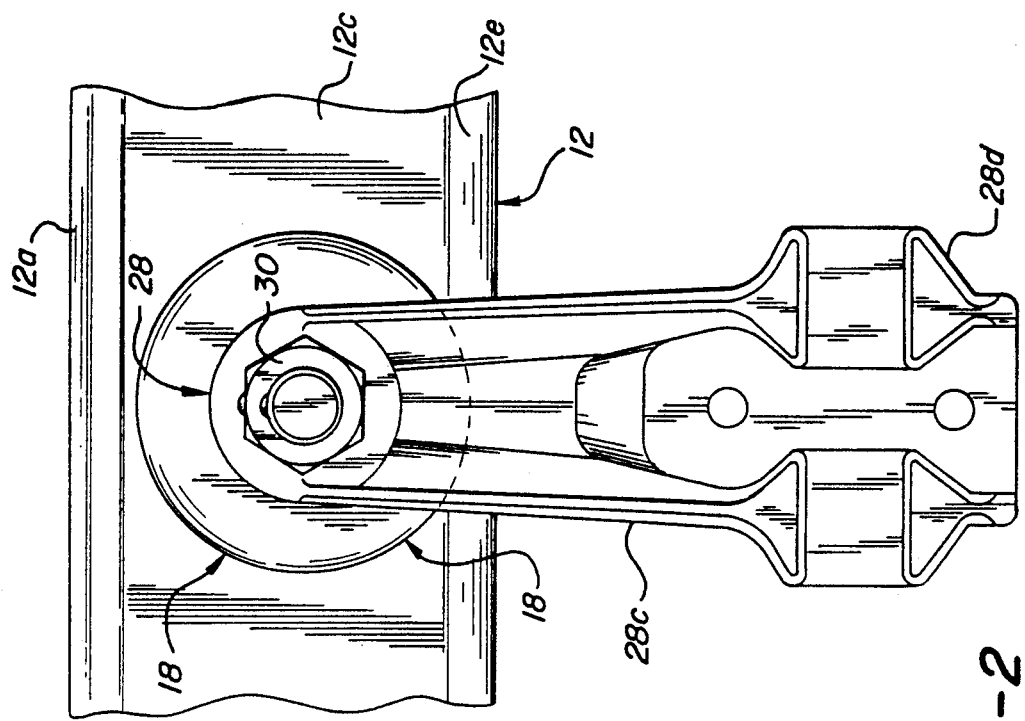
FIG. 2 is a fragmentary side view of the trolley roller assembly of FIG. 1.
Figure 1:
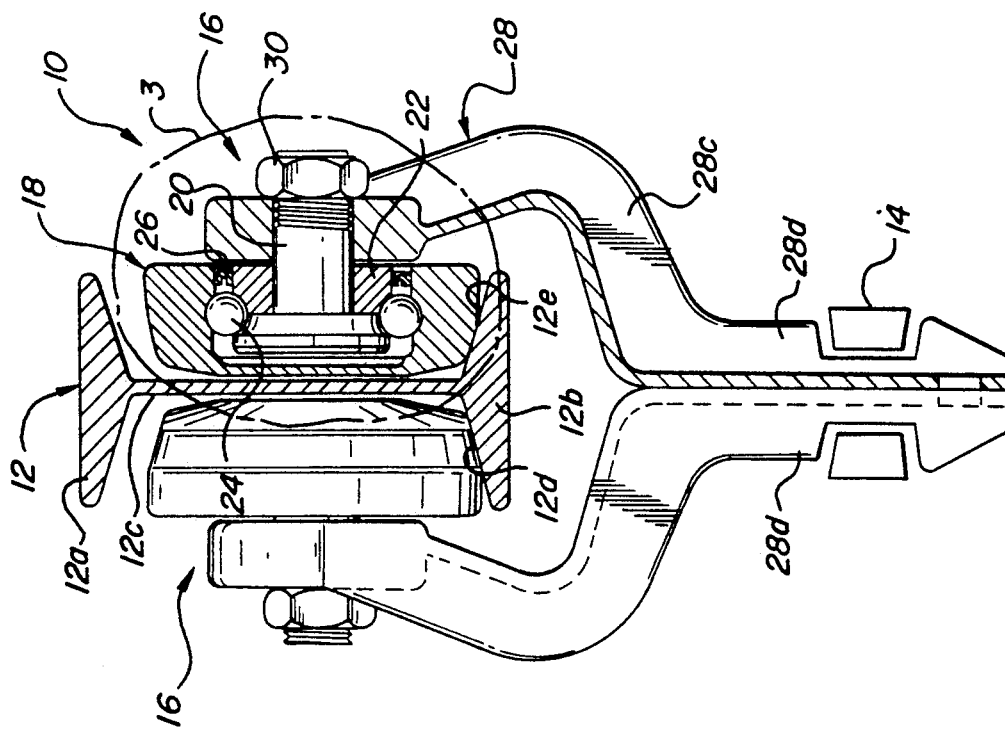
FIG. 1 is an end view of the trolley roller assembly according to invention.
Figure 3:
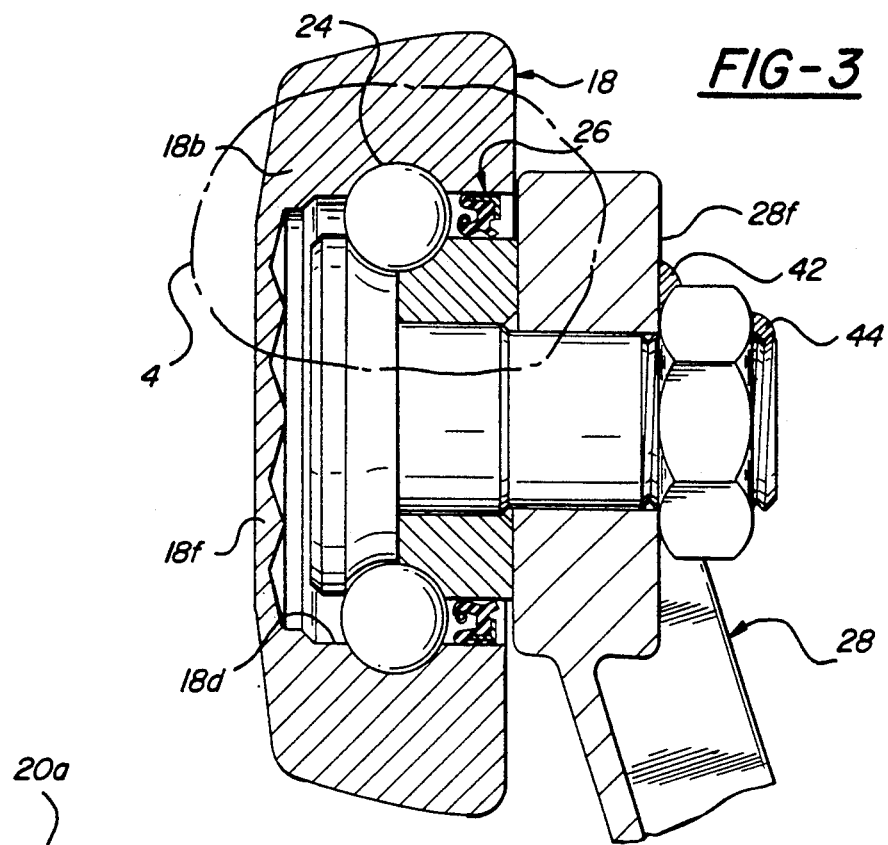
FIG. 3 is an enlarged view taken within the circle 3 of FIG. 1.
Figure 5:
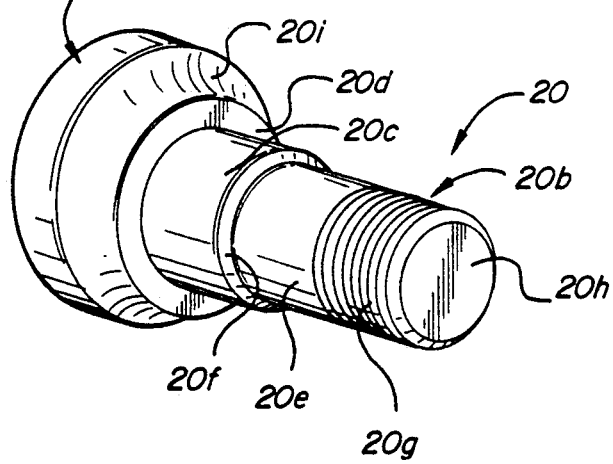
FIG. 5 is an enlarged perspective view of a pin member employed in the invention trolley roller assembly.
Figure 6:
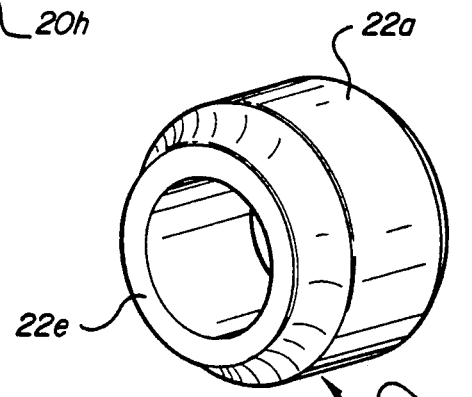
FIG. 6 is an enlarged perspective view of a collar member employed in the invention trolley roller assembly.

The invention trolley roller assembly 10 is seen in FIGS. 1 and 2 in association with a conveyor system including an overhead beam 12 and a conveyor chain 14. Beam 12 has an I configuration and includes an upper flange 12a, a lower flange 12b, and a central web 12c. Lower flange 12c defines a pair of parallel tracks 12d and 12e disposed on opposite sides of central web 12c.

Trolley assembly 10 includes a pair of identical trolley roller assemblies 16 positioned on opposite sides of central web 12c and respectively rollably engaging parallel tracks 12d and 12e.

Each roller assembly 16 includes a roller or wheel 18, a shaft or pin 20, a collar 22, a plurality of ball bearing members 24, a seal 26, a hanger 28, and a nut 30.

Roller 18 is machined from a steel blank and includes a generally cylindrical circumferential surface 18a, an inboard side wall 18b, an outboard side wall 18c, and a blind bore 18d opening in the outboard side wall 18c and extending to an inboard blind end face 18e proximate inboard side wall 18b but spaced therefrom by a solid body portion 18f of the roller. Blind bore 18d includes an annular inwardly opening groove or race 18g, an outboard bore portion 18h outboard of groove 18g, and an inboard bore portion 18i inboard of groove 18g.

Shaft or pin 20 is formed of a suitable steel material and includes a head portion 20a and a shaft portion 20b. Shaft portion 20b in turn includes an inboard portion 20c forming an annular shoulder 20d with head portion 20a, a reduced diameter outboard portion 20e forming a shoulder 20f with portion 20c, and a threaded portion 20g extending to the outboard end 20h of the pin. Pin 20 further includes an annular arcuate surface 20i having a radius of curvature corresponding to the radius of curvature of groove or outer race 18g, formed in the head portion 20a outboard of shoulder 20d, and extending through an included angle of approximately 60°.

Collar 22 is formed of a suitable steel material and has an outer diameter 22a corresponding to the outer diameter of pin head portion 20a, an inner diameter 22b slightly larger than the diameter of pin shaft portion 20c, and an axial length generally corresponding to the axial length of shaft portion 20c.

Collar 22 further defines an arcuate annular inboard surface 22d having a radius of curvature corresponding to the radius of curvature of groove 18g and surface 20i and extending through an included angle of approximately 60°. The annular surface 22e defined at the inboard end of the collar corresponds in size and configuration to pin shoulder 20d. The outer diameter 22a of collar 22 is less than the diameter of blind bore outward portion 18d.

Seal 26 is sized to be positioned on the outer peripheral surface 22a of collar 22 and includes an annular elastomeric member 32 and an annular steel member 34. Annular steel member 34 includes a vertical annular portion 34a and a horizontal annular portion 34b embedded in the annular outer portion 32a of the elastomeric member. Elastomeric member 32 further defines an inner annular portion 32b defining a primary annular seal 32c and a secondary annular seal 32d. A steel garter spring 36 is positioned radially outwardly of primary seal 32c to ensure positive seal contact. Seal 26 may, for example, be of the type available from John Crane Inc. of Morton Grove Ill. as Style Mo/L, Type 2.

Hanger 28 is formed of a forged steel and includes an upper hub or head portion 28a having a central aperture 28b sized to pass shaft portion 20e of pin 20, an angled intermediate portion 28c, and a lower portion 28d.

To assemble the invention trolley roller assembly, pin 20 is positioned in blind bore 18 to position the inboard face 20i of the pin head portion against the blind end 18e of the bore (as seen in dotted lines in FIG. 4) whereafter ball bearing elements 24 are positioned in outer race 18g, whereafter pin 20 is moved outboard to the solid line position of FIG. 4 to define half of the inner race, whereafter collar 22 is slipped into position over pin shaft portion 20c with collar annular surface 22e positioned against pin shoulder 20d, whereafter seal 26 is positioned in the annular space 40 defined between the outer periphery 22a of the collar and outboard blind bore portion 18h with primary seal 32c and secondary seal 32d respectively engaging pin shaft portion 22a at relatively inboard and relatively outboard locations, whereafter the hub portion 28a of hanger 28 is positioned over pin shaft portion 20e to position the inboard annular surface 28e of the hanger hub portion against the annular outboard surface 22f of the collar, whereafter nut 30 is threaded onto pin threaded portion 20g into abutting engagement with the outboard face 28f of the hanger hub portion, whereafter a weld 42 is applied between the nut and the outboard face 28f of the hanger hub portion and a weld 44 is applied between the nut and the threaded shaft portion 20g to preclude inadvertent backing off of the nut.

Roller assemblies 18 are positioned on opposite sides of side beam web 12c with the rollers in respective rolling contact with beam surfaces 20d and 20e and with the lower portions 28d of the hangers suitably secured together by bolting or welding. Conveyor 14 is positioned in known manner relative to the hangers to convey the hangers and thereby the trolley assemblies along the track.

It will be seen that in the assembled relation of the roller assembly the inner race for the ball bearing elements 24 is formed in part by the pin head portion and in part by the collar and, specifically, is formed in part by pin head portion arcuate surface 20i and in part by collar arcuate surface 22d. These surfaces coact to define an included angle of approximately 120° with the result that the depth X of the inner raceway is very large compared to the diameter of the ball bearing elements, comprising for example 30% of the ball bearing element diameter. The inner race thus provides a very deep ball path defining a high ball path shoulder so as to maintain the balls in the track to preclude damage to the balls or to the raceway shoulder even in the presence of heavy twisting loading imposed on the ball bearing via the loads carried by the hangers.

Similarly, the outer race 18g defines an included angle of approximately 120° with the result that the depth Y of the outer race is also approximately 30% of the ball element diameter so that the inner and outer races coact to firmly grasp the ball elements at their respective outer and inner peripheries to provide a total raceway/ball interface that is substantially greater than the interface normally provided in a ball bearing assembly, whereby to provide extreme resistance to ball element or raceway shoulder element damage even in the presence of heavy twisting loads.

A bearing lubricant 46, for example DuPont Kritox fluorinated high temperature grease, is provided in the volume of the roller assembly inboard of the seal 32. Lubricant 46 provides an anti-rust additive, is chemically inert, is biologically inert, is non-flammable, and provides a temperature range of continuous service of between $-5°$ F. and $450°$ F.

Lubricant 46 is effectively held within the roller assembly by seal 32 and specifically by the coaction of primary seal 32c, with the assistance of garter spring 36, and secondary seal 32d. It will be understood that primary seal 32c is primarily a lubricant seal whereas secondary seal 32d provides a secondary lubricant seal and also provides a contaminant seal to preclude the entry of dust, dirt or other contaminants into the roller assembly. The entry of contaminants into the roller assembly is further precluded by the fact that the head or hub portion 28a of the hanger has a diameter that exceeds the diameter of collar 22 so that the hub portion defines an annular surface 28g that at least partially blocks opening 40 so as to block direct access of contaminants to the seal area.

The invention trolley roller assembly will be seen to have many important advantages. Specifically, the unique manner in which the inner race of the bearing assembly is defined by coaction between the pin head portion and the collar allows an extremely deep inner race to be provided to provide extreme resistance to overturning or twisting moment loads in the bearing; the bearing structure also allows an extremely deep outer race to further enhance resistance to overturning moment loads; the use of a roller having a blind bore simplifies the sealing of the roller assembly by providing a solid wall portion of the roller at one end of the roller assembly; the use of fluorinated grease in the bearing allows the trolley assembly to operate in very high temperature environments that tend to carbonize conventional lubricants; the use of a seal having primary and secondary lip seals provides excellent lubricant retention and seal wiping action; and the enlarged diameter of the hub portion of the hanger acts to at least partially block the entry of contaminants into the seal area to further augment the sealing action of the trolley roller assembly.

Whereas a preferred embodiment of the invention has been illustrated and described in detail it will be apparent that various changes may be made in the disclosed embodiment without departing from the scope or spirit of the invention.

We claim:

1. A trolley roller assembly for use with a conveyor system and including a roller for rolling engagement with a track of the conveyor system and having a central bore, a trolley hanger, a pin member having a shaft portion passing through an aperture in the hanger and positioned in the roller bore, and bearing means interposed between the pin shaft portion and the roller, characterized in that the pin member further includes an enlarged head portion positioned in the roller bore and forming an annular shoulder with the pin member shaft portion, the roller bore is a blind bore having a blind inboard end formed by the roller and an open outboard end, the pin member shaft portion enters the bore through the open outboard end of the bore, the bearing means comprises an outer race formed as an annular groove in the roller opening in the roller bore, a plurality of balls rollably mounted in the annular groove, and an inner race formed in part by an arcuate annular groove in the pin member head portion and in part by a complementary arcuate annular groove formed in the inboard end of a collar surrounding the pin member shaft portion and positioned against the annular shoulder of the pin member, the outer periphery of the collar has a substantially constant diameter from the arcuate annular groove to the outboard end of the collar, the outer periphery of the collar coacts with the roller bore to define an annular bore, a seal is positioned in the annular bore and includes a rigid outer annular portion mounted in the roller bore and a resilient inner annular portion including at least one lip seal sealingly engaging the outer periphery of the collar, and the hanger includes a head portion defining the aperture in the hanger, positioned directly against the outboard face of the collar, and having a diameter exceeding the diameter of the collar so as to at least partially cover the outboard end of the annular bore.

2. A trolley roller assembly according to claim 1 wherein the head portion of the hanger has a diameter exceeding the diameter of the roller bore so as to totally cover the outboard end of the annular bore.

3. A trolley roller assembly according to claim 1 wherein said resilient inner annular portion of said seal comprises a double lip seal including a primary annular lip seal sealingly engaging the outer periphery of the collar and a secondary annular lip seal sealingly engaging the outer periphery of the collar outboard of the primary seal.

4. A trolley roller assembly according to claim 3 wherein the trolley roller assembly further includes a fluorinated high temperature lubricant filling an empty volume of the roller assembly, inboard of said seal.

* * * * *